(12) United States Patent
Horowitz et al.

(10) Patent No.: US 7,142,612 B2
(45) Date of Patent: Nov. 28, 2006

(54) METHOD AND APPARATUS FOR MULTI-LEVEL SIGNALING

(75) Inventors: Mark A. Horowitz, Menlo Park, CA (US); Scott C. Best, Palo Alto, CA (US); William F. Stonecypher, San Jose, CA (US)

(73) Assignee: Rambus, Inc., Los Altos, CA (US)

( * ) Notice: Subject to any disclaimer, the term of this patent is extended or adjusted under 35 U.S.C. 154(b) by 678 days.

(21) Appl. No.: 09/992,911

(22) Filed: Nov. 16, 2001

(65) Prior Publication Data

US 2003/0095606 A1    May 22, 2003

(51) Int. Cl.
*H04L 25/34* (2006.01)
*H04L 25/49* (2006.01)
*H03M 5/02* (2006.01)

(52) U.S. Cl. .................. 375/286; 375/288; 341/55; 341/56

(58) Field of Classification Search ............. 375/259, 375/260, 264, 286, 287, 292, 288; 341/55, 341/56, 102
See application file for complete search history.

(56) References Cited

U.S. PATENT DOCUMENTS 3,369,229 A * 2/1968 Dorros .................. 341/56
3,521,274 A * 7/1970 Sawai .................. 341/178
3,587,088 A * 6/1971 Franaszek .................. 341/51
3,754,237 A    8/1973 de Laage de Meux
4,408,189 A   10/1983 Betts et al.

(Continued)

FOREIGN PATENT DOCUMENTS

WO    WO 0197391 A2    12/2001

(Continued)

OTHER PUBLICATIONS

"Coding a Terminated Bus for Low Power", M.R. Stan & W.P. Burleson, Great Lakes Symposium on VSLI, pp. 70-73, Mar. 1995.

(Continued)

*Primary Examiner*—Jay K. Patel
*Assistant Examiner*—David B. Lugo
(74) *Attorney, Agent, or Firm*—Shemwell Mahamedi LLP

(57) ABSTRACT

A system transmits data on a multi-conductor signal path, which produces a current flow based on the value of the data transmitted. The system reduces changes in current flow between successive data transmissions by encoding data values represented by sets of N bits to produce corresponding sets of M symbols. Each set of M symbols represents multiple bits and each set of M symbols is selected to produce a current flow within a predetermined range of current flows. The sets of M symbols are transmitted across the multi-conductor signal path.

48 Claims, 8 Drawing Sheets

U.S. PATENT DOCUMENTS

| | | | |
|---|---|---|---|
| 4,486,739 | A | 12/1984 | Franaszek et al. |
| 4,495,626 | A | 1/1985 | Brunin et al. |
| 4,665,517 | A | 5/1987 | Widmer |
| 4,667,337 | A | 5/1987 | Fletcher |
| 4,855,742 | A | 8/1989 | Verboom |
| 5,142,167 | A | 8/1992 | Temple et al. |
| 5,740,201 | A | 4/1998 | Hui |
| 5,903,231 | A | 5/1999 | Emelko |
| 5,999,571 | A | 12/1999 | Shin et al. |
| 6,005,895 | A * | 12/1999 | Perino et al. ............... 375/288 |
| 6,067,326 | A | 5/2000 | Jonsson et al. |
| 6,067,594 | A | 5/2000 | Perino et al. |
| 6,078,627 | A | 6/2000 | Crayford |
| 6,094,461 | A | 7/2000 | Heron |
| 6,137,455 | A | 10/2000 | Duo |
| 6,154,498 | A | 11/2000 | Dabral et al. |
| 6,226,330 | B1 * | 5/2001 | Mansur ..................... 375/257 |
| 6,278,740 | B1 | 8/2001 | Nordyke |
| 6,324,602 | B1 | 11/2001 | Chen et al. |
| 6,359,931 | B1 | 3/2002 | Perino et al. |
| 6,556,628 | B1 | 4/2003 | Poulton et al. |
| 2003/0095606 | A1 | 5/2003 | Horowitz et al. |
| 2004/0150432 | A1 | 8/2004 | Poulton et al. |

FOREIGN PATENT DOCUMENTS

| | | | |
|---|---|---|---|
| WO | WO 01097391 A3 | 12/2001 | |

OTHER PUBLICATIONS

"Bus-Invert Coding for Low Power I/O", M.R. Stan & W.P. Burleson, IEEE Transactions on Very Large Scale Integration Systems, vol. XX, No. Y, 1999.

"A 500-MHz 4-Mb CMOS Pipeline-Burst Cache SRAM with Point-to-Point Noise Reduction Coding I/O", Nakamura et al., IEEE Journal of Solid-State Circuits, vol. 32, No. 11, Nov. 1997, 8 pp.

Carusone et al., "Differential Signaling with a Reduced Number of Signal Paths," IEEE Transactions on Circuits and Systems—II: Analog and Digital Signal Processing, Mar. 2001, pp. 294-300, vol. 48, No. 3.

Marsland et al., "A Network Multi-Processor for Experiments in Parallelism," Mar. 31, 1991, pp. 1-29.

Widmer et al., "A DC-Balanced, Partitioned-Block, 8B/10B Transmission Code," IBM J. Res. Develop., Sep. 1983, pp. 440-451, vol. 27, No. 5.

* cited by examiner

METHOD AND APPARATUS FOR MULTI-LEVEL SIGNALING

TECHNICAL FIELD

The present invention relates to multi-level signaling and, more particularly, to methods and circuits that encode multi-level signals to minimize the current fluctuations between successive data transmissions.

BACKGROUND

In a typical binary signaling system, each conductor in the transmission system can have one of two states: zero or one. In this type of system, each conductor transmits one bit of data at a time. A multi-level signaling system transmits data across a multiple conductors using several possible signal levels on each conductor. For example, a 4-PAM (4-level Pulse Amplitude Modulation) transmission system provides four different signal levels (i.e., four different symbols) on each conductor instead of two levels, as used in a binary system. The use of four different signal levels allows two bits of data to be transmitted across a single conductor simultaneously.

In a 4-PAM transmission system that uses current-based output drivers, the four different signal levels are represented by different current values. For example, the four different current levels may be identified as 0i, 1i, 2i, and 3i. Similarly, in a 4-PAM transmission system that uses voltage-based output drivers, the four different signal levels are represented by different voltage values. For example, the four different voltage levels may be identified as 0v, 1v, 2v, and 3v. These drivers are usually connected to a transmission line environment that presents an effective resistance or impedance to the output driver. This impedance causes the output voltage to change if a current driver output changes, and causes the output current to change if the value of the voltage driver changes.

These multi-level signals can be used in transmission systems that contain either differential pairs of signals, or a single-ended signal referenced to ground. In a transmission system utilizing many single-ended multi-level current-based transmitters, it is desirable to maintain the total signal current required to transmit a byte of data (or code word) at a relatively constant current level in comparison to other bytes of data (or code words). If the signal current fluctuates greatly from one byte to the next, the change in current flows through the power supply connections and causes noise on the integrated circuit. This current change occurs when using either voltage drivers or current drivers. The noise on the power supply increases in systems that have a high data transmission rate and fast edge rate transmitters. This noise on the power supply degrades the voltage margin of a particular transmission.

The question of coding a number to keep the output current constant (DC Balanced) has been studied for binary signals and various codes have been developed for these binary signals. The IBM 8b-10b code is an example of this type of code. The situation for multi-level signals is different than binary signals, and thus requires a different approach to coding.

An improved architecture and method described herein addresses these and other problems by encoding multi-level signals to minimize the current fluctuations between successive data transmissions.

SUMMARY

By encoding bytes of data, the system and method discussed herein is able to maintain a relatively constant current requirement between successive data transmissions, thereby reducing the noise on the power supply driving the transmission system. Several different encoding techniques are discussed herein for encoding bytes of data to reduce current fluctuations from one data transmission to the next.

In a particular embodiment, data is transmitted on a multi-conductor signal path. Such data transmission produces current flow based on the value of the data transmitted. The change in current flow between successive data transmissions is reduced by encoding the data values, which are represented by sets of N bits, to produce corresponding sets of M symbols. Each set of M symbols represents multiple bits. Each set of M symbols is selected to produce a current flow within a predetermined range of current flows.

In another embodiment, multi-level signaling is performed by determining whether signal current required to transmit a data element is within a predetermined range of current values. The data element is encoded if the current required to transmit the data element is not within the predetermined range of current values. The data element is encoded such that the signal current required to transmit the data element is within the predetermined range of current values.

Another embodiment encodes a set of bits for transmission in a system that supports at least four discrete signal levels on a transmission medium. A first group of N bits of the set of bits are encoded using a first encoding scheme to generate a first encoded bit set that includes at least N+1 bits such that the first encoded bit set has a first weighting corresponding to state of the at least N+1 bits of the first encoded bit set. A second group of N bits of the set of bits is encoded using a second encoding scheme to generate a second encoded bit set that includes at least N+1 bits such that the second encoded bit set has a second weighting corresponding to state of the at least N+1 bits of the second encoded bit set. When a combination of the first weighting and the second weighting is within a predetermined weighting range, the first and second encoded bit sets are combined to produce an output symbol set. When the combination of the first weighting and the second weighting is outside the predetermined weighting range, 1) a second group of N bits of the set of bits is encoded using a third encoding scheme to generate a third encoded bit set that identifies at least N+1 bits, such that the third encoded bit set has a third weighting that is different from the second weighting, and 2) the first and third encoded bit sets are combined to produce the output symbol set.

DETAILED DESCRIPTION

An improved architecture and method is discussed herein for encoding bytes of data to reduce the current fluctuations between transmission of successive bytes of data. In particular, the bytes of data are encoded in such a manner that the total current required to transmit bytes of data is similar from one byte of data to the next. A receiver of the data transmission has a decoding system that is capable of decoding the encoded bytes of data to recreate the original data stream.

Although particular examples are discussed herein using a four-level signaling system (including a 4-PAM system), the teachings of the present invention can be applied to any multi-level signaling system (such as a six-level or an eight-level transmission system).

Encoding the byte of data (or code word) before it is transmitted provides for an effective control of the signaling current used to transmit bytes of data. This increases the signal/noise ratio of the system, allowing one to make further engineering tradeoffs such as improved noise margin, increased communication distance, or greater number of bussed devices. The systems and methods described herein also provide a low-latency encoding scheme.

Figure 1A:
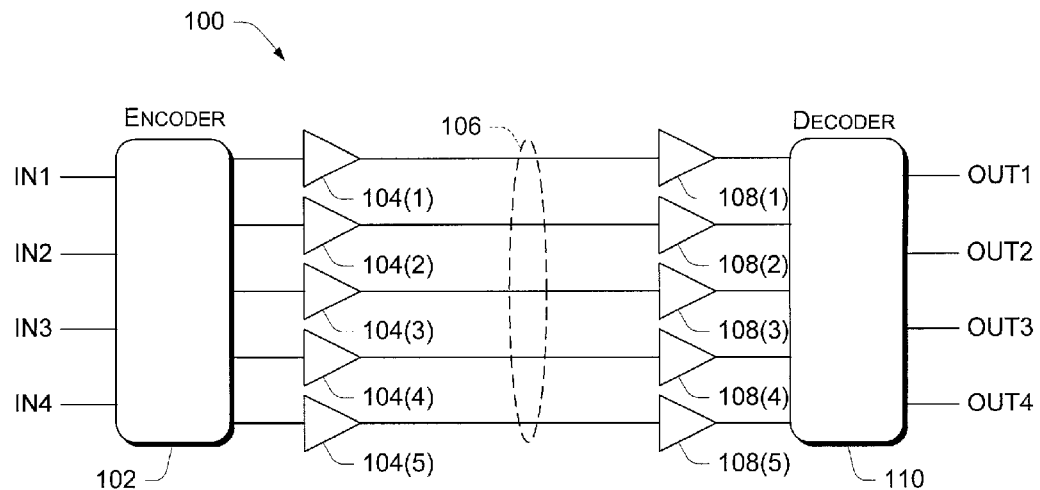
FIG. 1A is a block diagram illustrating an embodiment of a data transmission system using current-based output drivers.

FIG. 1A is a block diagram illustrating an embodiment of a data transmission system 100 using current-based output drivers. The data transmission system 100 is implemented as a 4-PAM system. The transmission system 100 includes five conductors between an encoder 102 and a decoder 110. The fifth conductor is used to transmit information identifying how the byte of data was encoded, thereby allowing the decoder 110 to properly decode the received data. The encoder 102 receives bytes of data on four two-bit input conductors labeled IN1, IN2, IN3, and IN4. These eight bits are organized as four MSB and four LSB, which are encoded into a set of five 4-PAM signals. The encoder 102 encodes the received bytes of data to reduce fluctuations in the total current required to transmit adjacent bytes of data. The output of the encoder is provided to five multi-level output drivers 104, which are coupled to a channel 106 containing five conductors. In a particular embodiment, channel 106 is a "Direct Rambus Channel" developed by Rambus Inc. of Los Altos, Calif. The Direct Rambus Channel connects memory devices to other devices such as microprocessors, digital signal processors, graphics processors and ASICs (not shown). The opposite end of channel 106 is coupled to five multi-level receivers 108, which receive the transmitted data. The received data is provided to a decoder 110, which decodes the received bytes of data. The decoder 110 generates an output on four conductors labeled OUT1, OUT2, OUT3, and OUT4, where each conductor represents a 2-bit value. The output of decoder 110 matches the input to the encoder 102.

Although particular implementations discussed herein use a 4-PAM system, the teachings herein may be applied to any X-PAM system where $X \geq 4$. For example, in an 8-PAM system, eight conductors are used, each of which represents a 3-bit value (LSB, middle bit, and MSB). In this example, a separate weighting is associated with each of the three bits.

As mentioned above, the encoding requirements for multi-level signaling is different than binary signaling, and thus requires a different approach to coding. In binary signaling, all signals have the same weight (they are either 0 or 1), so one possible goal of a code which minimizes transients is to generate a code which has a nearly constant number of '1's. However, in multi-level coding, the situation is different since some of the bits have higher current weights than others. For a binary-coded 4-level PAM bit, the most significant bit (MSB) of each symbol has twice the weight of the least significant bit (LSB). For these multi-level signals, the goal is to keep the sum of the output current nearly constant, which does not correspond to maintaining the number of '1's in the binary representation constant.

A particular embodiment describes a coding procedure used with a four-level signaling system. The coding procedure provides a mapping from input data to encoded output data. The mapping is performed with minimal bit manipulation. An exception system is used to provide all data values for the output set of data. The combination of the mapping function and the exception system provides a compact implementation suitable for high-speed bussed communications. The coding procedure described herein reduces the symbol sum deviation from 12i on four non-encoded 4-PAM signals to 1i on five encoded 4-PAM signals. The coding procedure ensures that the weighted sum of the five encoded 4-PAM signals is 7i or 8i, where 15i is the maximum sum across the set of signals.

To encode data, the eight bit input data is separated into four MSB bits and four LSB bits. This separation provides for four input symbols, each of which can range in value from zero to three. As discussed below, the data encoding is performed using two sub-encoders, one acting on the MSB bits as a group and the other acting on the LSB bits as a group. The MSB bits have a weight of two and the LSB bits have a weight of one.

Table 1 below illustrates an embodiment of the encoding (e.g., mapping) of the MSB bits. It will be appreciated that other coding procedures or tables may be used to implement the signaling system described herein.

TABLE 1

| d1, c1, b1, a1 | E1, D1, C1, B1, A1 | MSB Weight |
| --- | --- | --- |
| 0 0 0 0 | 1 0 1 0 1 | 6 |
| 0 0 0 1 | 1 0 0 0 1 | 4 |
| 0 0 1 0 | 1 0 0 1 0 | 4 |
| 0 0 1 1 | 1 0 0 1 1 | 6 |
| 0 1 0 0 | 1 0 1 0 0 | 4 |
| 0 1 0 1 | 0 0 1 0 1 | 4 |
| 0 1 1 0 | 0 0 1 1 0 | 4 |
| 0 1 1 1 | 0 0 1 1 1 | 6 |
| 1 0 0 0 | 1 1 0 0 0 | 4 |
| 1 0 0 1 | 0 1 0 0 1 | 4 |
| 1 0 1 0 | 0 1 0 1 0 | 4 |
| 1 0 1 1 | 0 1 0 1 1 | 6 |
| 1 1 0 0 | 1 1 1 0 0 | 6 |
| 1 1 0 1 | 0 1 1 0 1 | 6 |
| 1 1 1 0 | 0 1 1 1 0 | 6 |
| 1 1 1 1 | 1 1 0 1 0 | 6 |

The first column of Table 1 identifies the sixteen possible input MSB combinations, represented by the four bits: d1, c1, b1 and a1. The second column of Table 1 identifies the encoded MSB value associated with the corresponding input value in the first column. The encoded MSB value is represented by five bits: E1, D1, C1, B1 and A1. The third column of Table 1 identifies the MSB weight, i.e., the weighted sum of each of the encoded MSB values in the second column. Since each of the MSB bits has a weight of two, the MSB weight is calculated by multiplying the number of '1's in the encoded MSB by two (i.e., the weight of the MSB bit). Since each encoded MSB value in Table 1 has either two or three '1's, the MSB weight for each encoded MSB value is either four (2×2) or six (3×2). For the MSB sub-encoder, it is desirable to maintain the MSB weight at four or six to minimize the current fluctuations between temporally or physically successive bytes of data. As further discussed below, maintaining the MSB weight at four or six for all input combinations will allow the LSB sub-encoder to subsequently adjust the total signal weight at 7i or 8i.

The mapping function shown in Table 1 results in a majority of the bits passing through the mapping function unchanged. In most cases, the input bits are not changed by the mapping function. The additional encoded MSB bit (E1) is utilized to create two or three '1's in the encoded MSB value. The use of the E1 bit is sufficient to adjust all input values to within the weighted sum target of 4 or 6 with the exception of two entries (0000 and 1111). Here, two spare codes are assigned which have a minimal impact to the encoding or decoding functions. This is discussed further below.

When assigning the encoded MSB values in Table 1 above, several valid combinations were not used. Specifically, {1 0 1 1 0}, {0 0 0 1 1}, {0 1 1 0 0}, and {1 1 0 0 1} are not used as encoded MSB values, although each unused combination includes two or three '1's and, therefore, meet the requirement of a weighted sum of four or six. Any of these four unused combinations could be used to handle the two exception cases or for purposes other than transmitting data, such as control characters, without violating the goals of the mapping function.

Table 2 below illustrates an example of the encoding (e.g., mapping) of the LSB bits.

TABLE 2

| d0, c0, b0, a0 | E0, D0, C0, B0, A0 | LSB Weight | Inverted E0, D0, C0, B0, A0 | Inverted LSB Weight |
|---|---|---|---|---|
| 0 0 0 0 | Exception | | | |
| 0 0 0 1 | 0 0 0 0 1 | 1 | 1 1 1 1 0 | 4 |
| 0 0 1 0 | 0 0 0 1 0 | 1 | 1 1 1 0 1 | 4 |
| 0 0 1 1 | 0 0 0 1 1 | 2 | 1 1 1 0 0 | 3 |
| 0 1 0 0 | 0 0 1 0 0 | 1 | 1 1 0 1 1 | 4 |
| 0 1 0 1 | 0 0 1 0 1 | 2 | 1 1 0 1 0 | 3 |
| 0 1 1 0 | 0 0 1 1 0 | 2 | 1 1 0 0 1 | 3 |
| 0 1 1 1 | 1 1 0 0 0 | 2 | 0 0 1 1 1 | 3 |
| 1 0 0 0 | 0 1 0 0 0 | 1 | 1 0 1 1 1 | 4 |
| 1 0 0 1 | 0 1 0 0 1 | 2 | 1 0 1 1 0 | 3 |
| 1 0 1 0 | 0 1 0 1 0 | 2 | 1 0 1 0 1 | 3 |
| 1 0 1 1 | 1 0 1 0 0 | 2 | 0 1 0 1 1 | 3 |
| 1 1 0 0 | 0 1 1 0 0 | 2 | 1 0 0 1 1 | 3 |
| 1 1 0 1 | 1 0 0 1 0 | 2 | 0 1 1 0 1 | 3 |
| 1 1 1 0 | 1 0 0 0 1 | 2 | 0 1 1 1 0 | 3 |
| 1 1 1 1 | 1 0 0 0 0 | 1 | 0 1 1 1 1 | 4 |

The first column of Table 2 identifies the sixteen possible LSB combinations, represented by the four bits: d0, c0, b0 and a0. The second column of Table 2 identifies the encoded LSB value associated with the corresponding four-bit LSB combination. The encoded LSB value is represented by five bits: E0, D0, C0, B0 and A0. The encoded LSB value associated with the four-bit LSB combination "0000" is handled in a special manner using the exception system discussed below. The third column of Table 2 identifies the LSB weight, which is the sum of the encoded LSB values in the second column (i.e., the sum of the '1's in the encoded LSB value). The fourth column of Table 2 identifies the inverted LSB value (i.e., the inverse of the bits shown in the second column of Table 2). The fifth column identifies the weight of the inverted LSB value. As shown in Table 2, the LSB weight (column three) is one or two and the inverted LSB weight is three or four.

As discussed earlier, it is desirable to maintain a weighted sum for an encoded word of either 7i or 8i, where the word sum is the sum of the MSB weight and the LSB weight. As shown in Table 1,the MSB encoding function outputs {E1, D1, C1, B1, A1} produce a weighted sum of four or six. Thus, to maintain a word sum of 7i or 8i, the encoded LSB bits {E0, D0, C0, B0, A0} need to add three or four when the MSB weighted sum is four, and need to add one or two when the MSB weighted sum is six. As shown in Table 2,all of the LSB weights (except 0000) have a resulting weighted sum of one or two so will directly add to the MSB weighted sum of six. When the MSB weighted sum is four, the inverse of the LSB outputs is used, which results in a LSB weight of three or four.

The encoding function shown in Table 2 results in a majority of the bits passing through the encoding function unchanged. In most cases, the input bits are not changed by the encoding function. For the inputs {d0, c0, b0, a0} that have more than two '1's (e.g., 0111, 1011, 1101, 1110 and 1111), the E0 bit is used as an indicator that the {D0, C0, B0, A0} outputs are inverted from their corresponding input values. Thus, if E0 is one, the input bits are inverted. If E0 is zero, then the input bits remain unchanged. Having the E0 bit set to one in combination with the remaining inverted bits provides an LSB weight of one or two.

As mentioned above, an exception system is used to complete the LSB table (Table 2) where the input value {d0, c0, b0, a0} is {0 0 0 0}. This value leaves 16 of the 256 input values without a corresponding output value (i.e., the 16 eight bit values that end in "0000"). The exception system uses some of the unused MSB output codes as "exception indicators." These exception indicators are used by a decoding system to properly handle the exception cases.

Figure 1B:
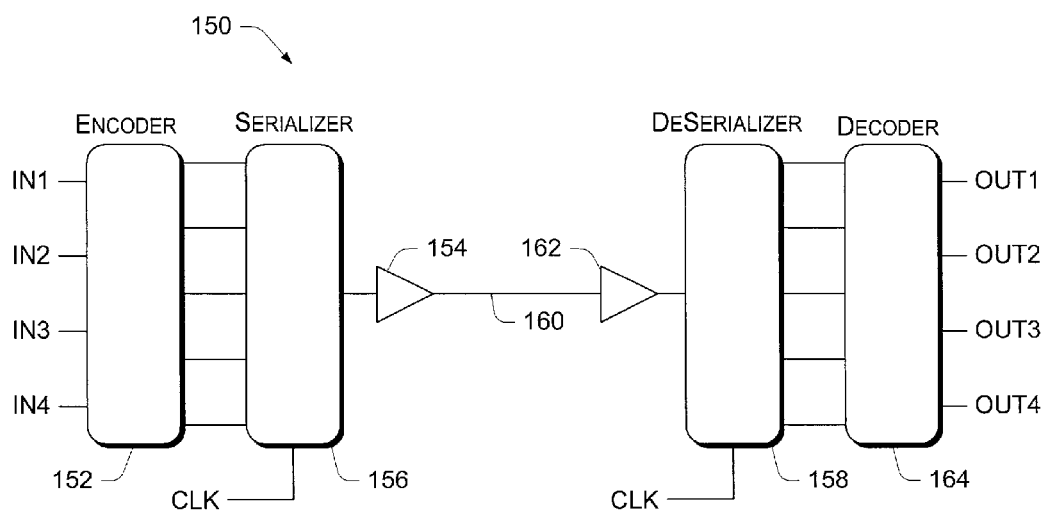
FIG. 1B is a block diagram illustrating an alternate embodiment of a data transmission system.

FIG. 1B is a block diagram illustrating an alternate embodiment of a data transmission system 150. Data transmission system 150 is similar to system 100 shown in FIG. 1A, but transmits data serially rather than in parallel. An encoder 152 receives bytes of data on four two-bit input conductors labeled IN1,IN2,IN3, and IN4.These eight bits are organized as four MSB and four LSB, which are encoded using methods described herein to reduce current fluctuations into a set of five 2-bit conductors. The five conductors serve as inputs to a serializer 156 or shift register. A 2-bit conductor connects the output of the serializer 156 to a multi-PAM output transmitter 154 driving a communications medium 160.

The serial data stream is received by a multi-PAM receiver 162, converting the multi-PAM input into a 2-bit output value. The multi-PAM receiver 162 is connected to a deserializer 158 or shift register which accumulates five 2-bit symbols (values). The output of the deserializer 158 is connected to a decoder 164 which is described herein. The decoder 164 generates an output on four conductors labeled OUT1, OUT2, OUT3, and OUT4, where each conductor represents a 2-bit value. The output of decoder 164 matches the input to the encoder 152.

The encode and decode function taught within this invention have several beneficial characteristics for serial multi-PAM communications. The data stream will be DC balanced which is necessary for AC-coupled applications. Every five symbols will have both a 1–>0 and 0–>1 transition on the MSB providing high transition density for clock recovery. As well, there are several spare codes which can be used for unique control characters to support a variety of communications protocols.

Figure 2:
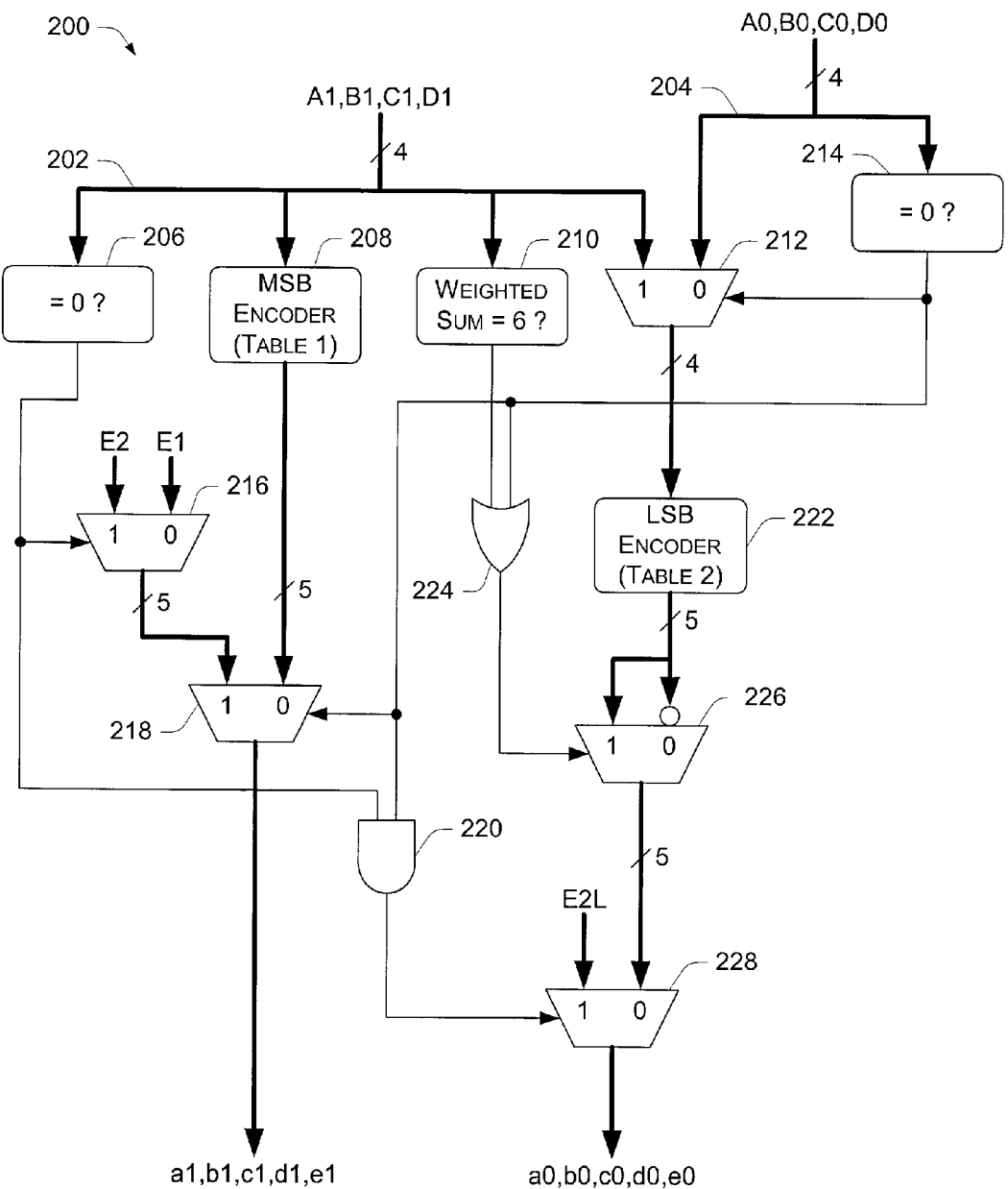
FIG. 2 illustrates an example of an encoding circuit that encodes multi-level signals in a manner that minimizes current fluctuations between adjacent bytes of data.

FIG. 2 illustrates an example of an encoding circuit 200 that encodes multi-level signals in a manner that minimizes current fluctuations between adjacent bytes of data. The encoding circuit 200 receives an MSB (represented by A1, B1, C1 and D1) on a four bit bus 202, and a LSB (represented by A0, B0, C0 and D0) on another four bit bus 204. Bus 202 is coupled to a comparator 206, an MSB encoder 208, another comparator 210, and a multiplexer 212. Comparator 206 determines whether the MSB is zero (i.e., all four bits are zero) by comparing the MSB to a zero value. The output of comparator 206 is '0' if the MSB is non-zero and the output of comparator 206 is '1' if the MSB is zero. MSB encoder 208 encodes the MSB into a five bit signal corresponding to the function shown in Table 1 above. Comparator 210 determines whether the weighted sum of the MSB bits is six. The output of comparator 210 is '0' if the weighted sum of the MSB is not six, and the output of comparator 210 is '1' if the weighted sum of the MSB is six.

Bus 204 is coupled to multiplexer 212 and a comparator 214. Comparator 214 determines whether the LSB is zero (i.e., all four bits are zero) by comparing the LSB to a zero value. The output of comparator 214 is '0' if the LSB is non-zero, and the output of comparator 214 is '1' if the LSB is zero. The output of comparator 214 is coupled to the select control of multiplexer 212. Multiplexer 212 selects the MSB or the LSB based on the output of comparator 214. If the output of comparator 214 is '1', the output of multiplexer 212 is the MSB. If the output of comparator 214 is '0', the output of multiplexer 212 is the LSB.

A multiplexer 216 receives two different five bit signals, labeled "E1" and "E2". In one implementation, E1 is "10110" and E2 is "00011". The select control input for multiplexer 216 is coupled to the output of comparator 206. If the output of comparator 206 is '0' (MSB is non-zero), E1 is selected by multiplexer 216. If the output of comparator 206 is '1' (MSB is zero), E2 is selected by multiplexer 216.

A multiplexer 218 receives five bit signals from the output of multiplexer 216 and the output of MSB encoder 208. The select control input for multiplexer 218 is coupled to the output of comparator 214, which identifies whether the LSB is zero. If the output of comparator 214 is '0' (LSB is non-zero), the output of MSB encoder 208 is selected by multiplexer 218. If the output of comparator 214 is '1' (LSB is zero), the output of multiplexer 216 is selected by multiplexer 218. The output of multiplexer 218 is the encoded MSB signal.

The output of multiplexer 212 is coupled to the input of a LSB encoder 222, which encodes the LSB into a five bit signal corresponding to the function shown in Table 2 above. The output of LSB encoder 222 is coupled to an inverted input and a non-inverted input of a multiplexer 226. The select control input of multiplexer 226 is coupled to the output of an OR gate 224, which receives inputs from comparator 210 and comparator 214. The output of OR gate 224 is '1' when the output of comparator 210 is '1' (weighted sum of MSB is six) or the output of comparator 214 is '1' (LSB is zero) Otherwise, the output of OR gate 224 is '0'. If the select control input receives '1', multiplexer 226 selects the five bit signal received from LSB encoder 222. If the select control input receives '0', multiplexer 226 selects the inverse of the five bit signal received from LSB encoder 222 (i.e., each of the five bits is inverted).

A multiplexer 228 is coupled to receive the output of multiplexer 226 and a signal identified as "E2L". In one implementation, E2L is "00111". The select control input of multiplexer 228 is coupled to the output of an AND gate 220. AND gate 220 receives inputs from the output of comparator 206 and from the output of comparator 214. If both the output of comparator 206 is '1' (MSB is zero) and the output of comparator 214 is '1' (LSB is zero), the output of AND gate 220 is '1'. Otherwise, the output of AND gate 220 is '0'. If the output of AND gate 220 is '0', multiplexer 228 selects the output of multiplexer 226. If the output of AND gate 220 is '1', multiplexer 228 selects E2L. The output of multiplexer 226 is the encoded LSB signal.

In operation, the encoding circuit 200 shown in FIG. 2 encodes the MSB and LSB using the functions described in Table 1 and Table 2 above. The circuit shown in FIG. 2 also handles the exception system when the LSB is "0000". Specifically, when the LSB is zero, the circuit multiplexes the MSB input data into the LSB input encoder 222 using multiplexer 212. Thus, when the LSB is zero, the MSB bits are used in place of the LSB bits. One exception code (E1) is used when the MSB is non-zero and another exception code (E2) is used when the MSB is zero. These exception codes (E1 and E2) are selected by multiplexer 216.

As mentioned above, when the LSB is zero, the MSB bits are provided to LSB encoder 222 through multiplexer 212. One of the unused MSB codes (exception code E1) is used to identify the situation where the LSB is zero. A particular implementation assigns the value "10110" to E1. In alternate implementations, any other unused code may be substituted for "10110", with a corresponding change in the decoder circuit and compensation for any change in the weighted sum for E1.

When both the MSB is zero and the LSB is zero, swapping the MSB into the LSB is not sufficient. In this situation, an additional unused MSB code (E2) is driven onto the MSB outputs. When this code is received by a decoder circuit, the decoder knows to drive all '0's for all outputs, regardless of the LSB value. In one implementation, the value of E2 is "00011". Additionally, since the LSB values are not correct, another code (E2L) is driven onto the LSB outputs each time that E2 is driven onto the MSB outputs. The value of E2L is chosen such that the sum of all bits transmitted is 7i or 8i. In this example, the value of E2L is "00111". This implementation generates a sum of 7i (E2 has a weight of four which is added to E2L which has a weight of three).

Figure 3:
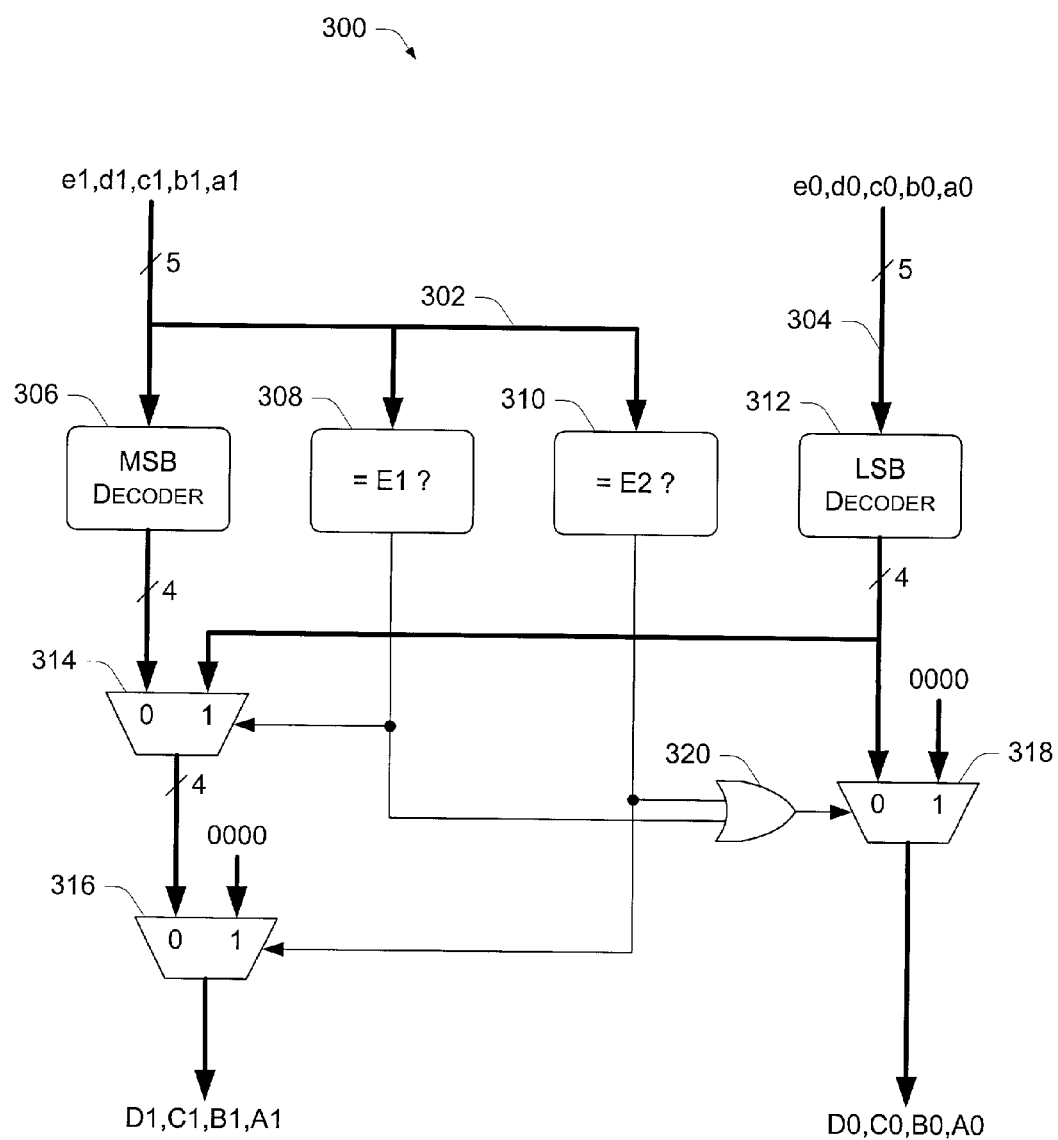
FIG. 3 illustrates an exemplary decoding circuit that decodes the signals generated by the encoding circuit shown in FIG. 2.

When it is desirable to send control codes using the some of the spare codes available, an additional input will be necessary to specify that a control character is desired. The existing circuit could be easily extended such that the control signal selects a new control code onto the outputs a1, b1, c1, d1, e1. The control code would be selected from one of the available spare MSB values. FIG. 3 illustrates an exemplary decoding circuit 300 that decodes the signals generated by the encoding circuit shown in FIG. 2. The encoded MSB is received on a bus 302, which is coupled to an MSB decoder 306, a first exception code (E1) comparator 308, and a second exception code (E2) comparator 310. MSB decoder 306 decodes the received five bit signal (the encoded MSB) into a four bit MSB using the function described above with respect to Table 1.First exception code comparator 308 determines whether the first exception code E1 is present in the encoded MSB. If the encoded MSB contains E1, the output of comparator 308 is '1' Otherwise, the output of comparator 308 is '0'. Second exception code comparator 310 determines whether the second exception code E2 is present in the encoded MSB. If the encoded MSB contains E2, the output of comparator 310 is '1'. Otherwise, the output of comparator 310 is '0'. The encoded LSB is received on a bus 304, which is coupled to an LSB decoder 312. LSB decoder 312 decodes the received five bit signal (the encoded LSB) into a four bit LSB using the function described above with respect to Table 2.The output of LSB decoder 312 is provided to an input of a multiplexer 318. The other input of multiplexer 318 receives a zero value (i.e., "0000"). The select control input of multiplexer 318 is coupled to the output of an OR gate 320. OR gate 320 receives input signals from first exception code comparator 308 and second exception code comparator 310. If the output of either comparator 308 or 310 is '1', the output of OR gate 320 is '1'. Otherwise, the output of OR gate 320 is '0'. If the output of OR gate 320 is '1' (i.e., one of the exception codes was detected in the encoded MSB), multiplexer 318 selects "0000" as the multiplexer output. If the output of OR gate 320 is '0' (i.e., no exception codes detected in the encoded MSB), multiplexer 318 selects the output of the LSB decoder as the multiplexer output. The output of multiplexer 318 is the decoded LSB.

A multiplexer 314 receives inputs from MSB decoder 306 and LSB decoder 312. The select control input for multiplexer 314 is coupled to the output of the first exception code comparator 308. If the output of comparator 308 is '1' (i.e., the E1 exception code was detected in the encoded MSB), multiplexer 314 selects the output from LSB decoder 312. Otherwise, multiplexer 314 selects the output from MSB decoder 306. The output of multiplexer 314 is coupled to an input of another multiplexer 316. The other input of multiplexer 316 receives a constant value "0000". The select control input for multiplexer 316 is coupled to the output of the second exception code comparator 310. If the output of comparator 310 is '1' (i.e., the E2 exception code was detected in the encoded MSB), multiplexer 316 selects the constant value "0000". Otherwise, multiplexer 316 selects the output from multiplexer 314. The output of multiplexer 316 is the decoded MSB.

In operation, the decoding circuit 300 shown in FIG. 3 decodes the encoded MSB and the encoded LSB using the functions described in Table 1 and Table 2 above. The circuit shown in FIG. 3 also handles the exception system discussed above. The decoding circuit 300 receives ten bits (five MSB bits and five LSB bits) from, for example, a high-speed receiver and serializer (not shown). Eight bits (four MSB bits and four LSB bits) are generated as an output from decoding circuit 300.

Since the exception codes E1 and E2 are provided on the MSB input signals {e1,d1,c1,b1,a1}, these bits are compared to a possible match of an exception code. A detected E1 code indicates that the decoded LSB should have a value of "0000". When the E1 code is detected, the output of LSB decoder 312 is multiplexed (via multiplexer 314) onto the MSB output bits, and the LSB output bits are driven to "0000". When the E2 code is detected in the MSB input signals, both the MSB outputs and the LSB outputs are driven to "0000". When neither exception code is detected in the MSB input signals, the outputs of both the MSB decoder 306 and the LSB decoder 312 are selected as the outputs of decoding circuit 300.

In an alternate embodiment, one or more control characters may be communicated using one or more of the unused codes as control character identifiers. In this embodiment, a control character identifier is coupled to bus 302. If a control character is identified, the control character identifier generates an output that selects the appropriate multiplexers in the decoding circuit 300. The existence of a control code is identified on bus 302 (i.e., the MSB) and the actual control code value is made available on bus 304 (i.e., the LSB). In this alternate embodiment, an additional output signal is provided from the decoder in order to communicate the fact that a control character was received.

Figure 4:
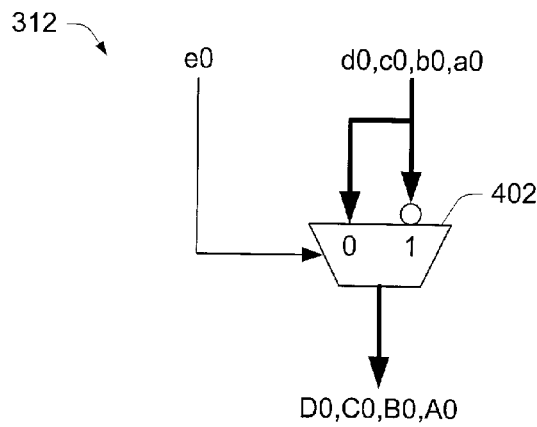
FIG. 4 illustrates an example LSB decoder used in the decoding circuit shown in FIG. 3.

FIG. 4 illustrates an example LSB decoder, such as LSB decoder 312 used in the decoding circuit shown in FIG. 3. A multiplexer 402 has an inverted input and a non-inverted input, each of which receives four bits (i.e., d0, c0, b0 and a0) of the encoded LSB signal. The fifth bit (i.e., e0) of the encoded LSB signal is coupled to the select control input of multiplexer 402. As discussed above, when encoding the LSB, if bit e0 is '1', the remaining bits in the LSB are inverted. Thus, to properly decode the encoded LSB signal, the bits of the encoded LSB signal are inverted when bit e0 is '1'. Thus, if e0 is '1', multiplexer 402 selects the inverted input, which causes the multiplexer to output inverted bits d0, c0, b0 and a0. If e0 is '0', multiplexer 402 selects the non-inverted input, which causes the multiplexer to output the bits d0, c0, b0 and a0 as received (i.e., not inverted). The logic function performed by multiplexer 402 is equivalent to an exclusive-OR (XOR) operation.

Figure 5:
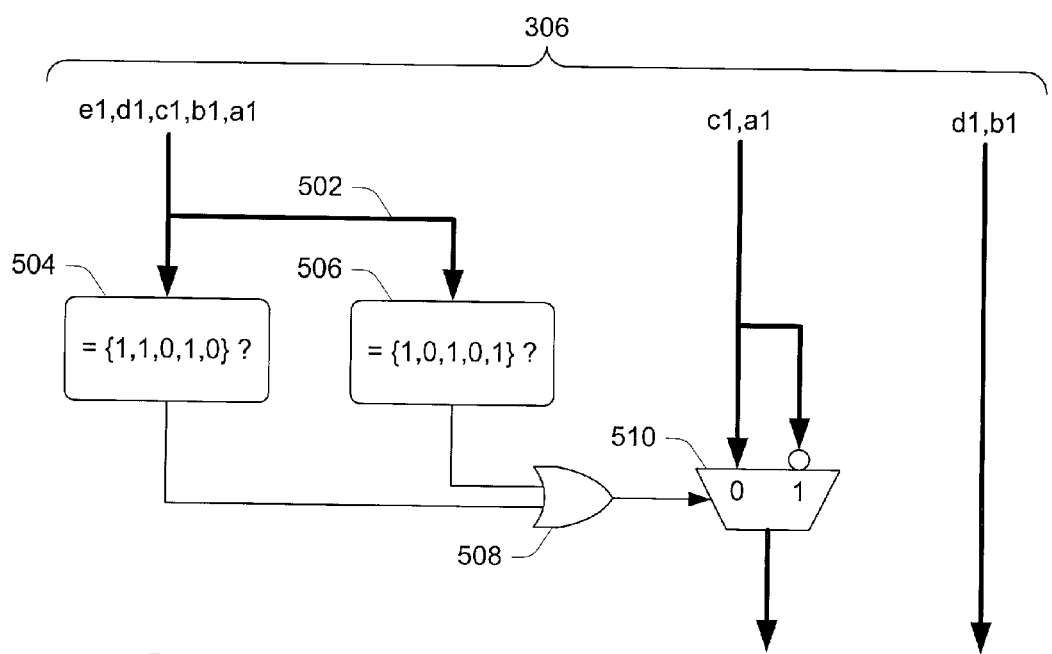
FIG. 5 illustrates an example MSB decoder used in the decoding circuit shown in FIG. 3.

FIG. 5 illustrates an example MSB decoder, such as MSB decoder 306 used in the decoding circuit shown in FIG. 3. The encoded MSB bits are received on a bus 502, which is coupled to a first comparator 504 and a second comparator 506. The comparators 504 and 506 determine whether particular combinations of bits are present on bus 502 which require special processing. A multiplexer 510 includes an inverted input and a non-inverted input, each of which receives two bits (i.e., c1 and a1) of the encoded MSB signal. Multiplexer 510 has a select control input which is coupled to the output of an OR gate 508. OR gate 508 receives inputs from comparators 504 and 506. The output of OR gate 508 is '1' if one of the two particular combinations are detected in the encoded MSB bits. Otherwise, the output of OR gate 508 is '0'. If the output of OR gate 508 is '1', multiplexer 510 selects the inverted input, which causes the multiplexer to output the inverted values of bits c1 and a1. Otherwise, multiplexer 510 outputs the non-inverted values of bits c1 and a1. As shown in Table 1,bits b1 and d1 do not change during the encoding process (i.e., in all sixteen combinations, the value of b1 and d1 are the same after the encoding function is applied). Thus, bits b1 and d1 are not changed during the decoding process.

The two particular combinations mentioned above occur when the bits received on bus 502 are "11010" or "10101". As shown in Table 1,these two cases represent the two combinations in which the values of a1 and c1 are inverted during the encoding process. For all other combinations, the values of bits a1 and c1 are not changed as a result of the encoding process. The logic function performed by multiplexer 510 is equivalent to an exclusive-OR (XOR) operation.

Figure 6:
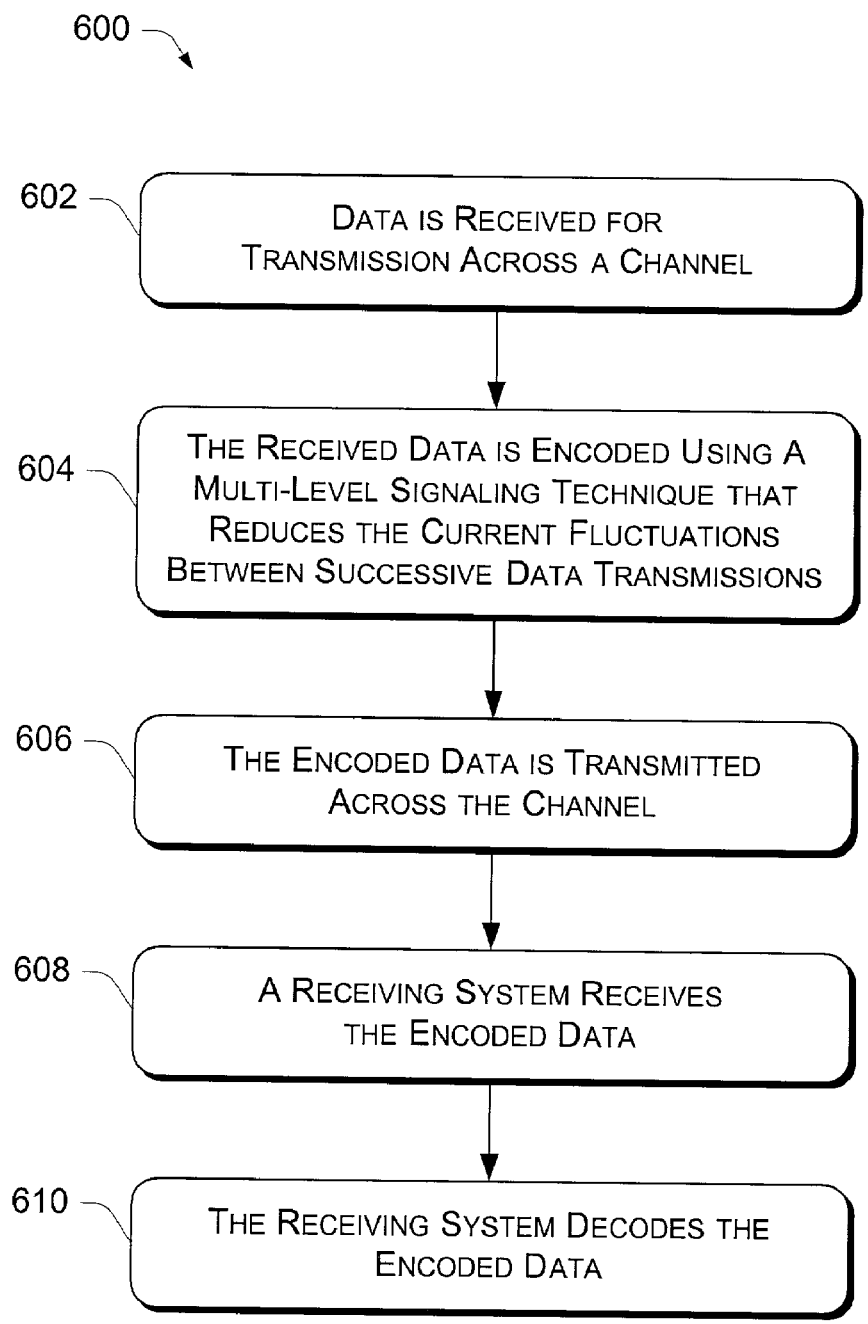
FIG. 6 is a flow diagram illustrating a procedure for transmitting data with minimal current fluctuations between adjacent data transmissions.

FIG. 6 is a flow diagram illustrating a procedure 600 for transmitting data with minimal current fluctuations between successive data transmissions. Data is received for transmission across a channel or other transmission path (block 602). The received data is encoded using a multi-level signaling technique that reduces the current fluctuations between successive data transmissions (block 604). For example, the received data may be encoded using the techniques discussed above with respect to Table 1,Table 2,and FIG. 2. The encoded data is transmitted across the channel (block 606). A receiving system at a receiving end of the channel receives the encoded data (block 608). The receiving system decodes the encoded data (block 610). For example, the received data may be encoded using the techniques discussed above with respect to Table 1,Table 2,and FIGS. 3–5.

Figure 7:
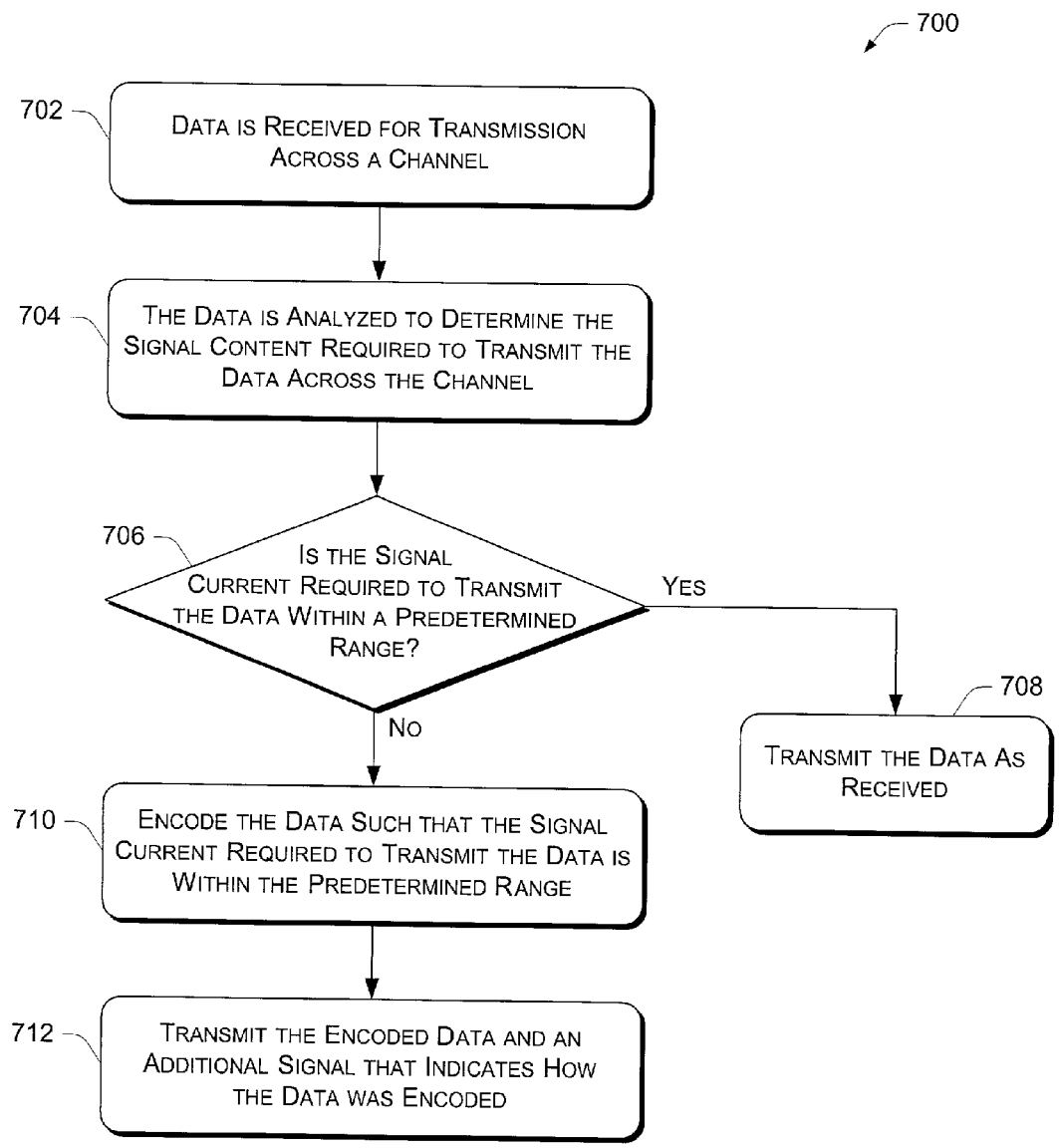
FIG. 7 is a flow diagram illustrating another procedure for encoding bytes of data to minimize current fluctuations from one byte of data to the next.

FIG. 7 is a flow diagram illustrating another procedure for encoding bytes of data to minimize current fluctuations from one byte of data to the next. Initially, data is received for transmission across a channel, bus, or other collection of conductors (block 702). Before the data is provided to the output drivers, the data is analyzed to determine the signal content required to transmit the data across the channel (block 704). Next, the procedure 700 determines whether the signal current required to transmit the data falls within a predetermined range (block 706).

In a 4-level signaling system (such as 4-PAM), the possible range of current values for each symbol is 0i, 1i, 2i, or 3i. For eight symbols of a 4-PAM byte, the possible range of current required to transmit the eight symbols is 0i to 24i (i.e., 8 symbols×3i). In a particular implementation, the transmission system designer has selected 8i to 16i as the preferred range for the total current required to transmit the data. This preferred range represents the middle third of the range 0i to 24i. In alternate embodiments, the preferred range may be the first third of the range 0i to 24i (i.e., 0i to 8i) or the last third of the range 0i to 24i (i.e., 16i to 24i).

Referring again to FIG. 7, if the signal current required to transmit the data is within the predetermined range, then procedure 700 branches from block 706 to block 708, where the data is transmitted without encoding. If the signal current required to transmit the data is not within the predetermined range, then the procedure 700 continues from block 706 to block 710, where the data is encoded such that the signal current required to transmit the data is within the predetermined range. Next, the encoded data is transmitted along with an additional signal (2 bits) that indicates how the data was encoded (block 712). This additional signal is required to indicate to the decoder how to decode the encoded byte. Each successive data transmission may be encoded in a different manner. Therefore, an additional signal is transmitted along with each data transmission. In an alternate implementation, this additional signal is also transmitted if the data is not encoded. In this implementation, the additional signal provides an indication to the decoder that the data does not require any decoding.

When encoding a byte of data, each of the four two-bit symbols in the byte is incremented by 1, 2,or 3 using modulo 4 arithmetic until the signal current required to transmit the byte of data falls within the predetermined range. The additional signal sent with the byte of data indicates whether the encoder incremented the byte by 1, 2,or 3,or whether the encoder did not increment the byte (i.e., the byte of data was not encoded).

The encoding process first determines whether incrementing each symbol in the byte of data by one would result in a byte of data requiring a signal current that is within the predetermined range. If so, each symbol in the byte of data is incremented by one and an additional two-bit signal "01" is appended to the transmitted data to indicate to the decoder that the each symbol in the original byte of data was incremented by one. If incrementing each symbol by one does not provide an acceptable signal current, then the encoding process determines whether incrementing each symbol by two would result in a byte of data requiring a signal current that is within the predetermined range. If so, each symbol in the byte of data is incremented by two and an additional signal "10" is appended to the transmitted data to indicate to the decoder that each symbol in the original byte of data was incremented by two. If incrementing each symbol by two does not provide an acceptable signal current, then the encoding process increments each symbol in the byte of data by three and an additional signal "11" is appended to the transmitted data to indicate to the decoder that each symbol in the original byte of data was incremented by three. If the original byte of data was not encoded, then an additional signal "00" is appended to the transmitted data to indicate to the decoder that the original byte of data was not encoded.

In an example of the encoding process, a byte of data to be transmitted is 00001230 (represented as 01101100 in binary) and the predetermined range of signal current required to transmit the byte of data is 8i to 16i. The signal current required to transmit this byte of data is 6i, which is the numerical bitwise sum of the byte (1i+2i+3i). Since 6i is not within the predetermined range of 8i to 16i, the byte of data will be encoded. Initially, the encoding process determines whether incrementing each symbol by one will result in a byte of data requiring a signal current that is within the predetermined range. In this example, incrementing each symbol by one produces 11112301 (0 increments to 1, 1 increments to 2, 2 increments to 3,and 3 increments to 0 with the carry being discarded). The signal current required to transmit this encoded byte of data is 10i (1i+1i+1i+1i+2i+3i+1i), which is within the predefined range of 8i to 16i. Therefore, this encoded byte of data is transmitted along with an additional two-bit signal ("01") indicating that each symbol of the original byte of data was incremented by one. Thus, the resulting nine symbol transmission is 111123011. The decoder then decodes the received encoded byte by decrementing each symbol in the byte by one.

Figure 8:
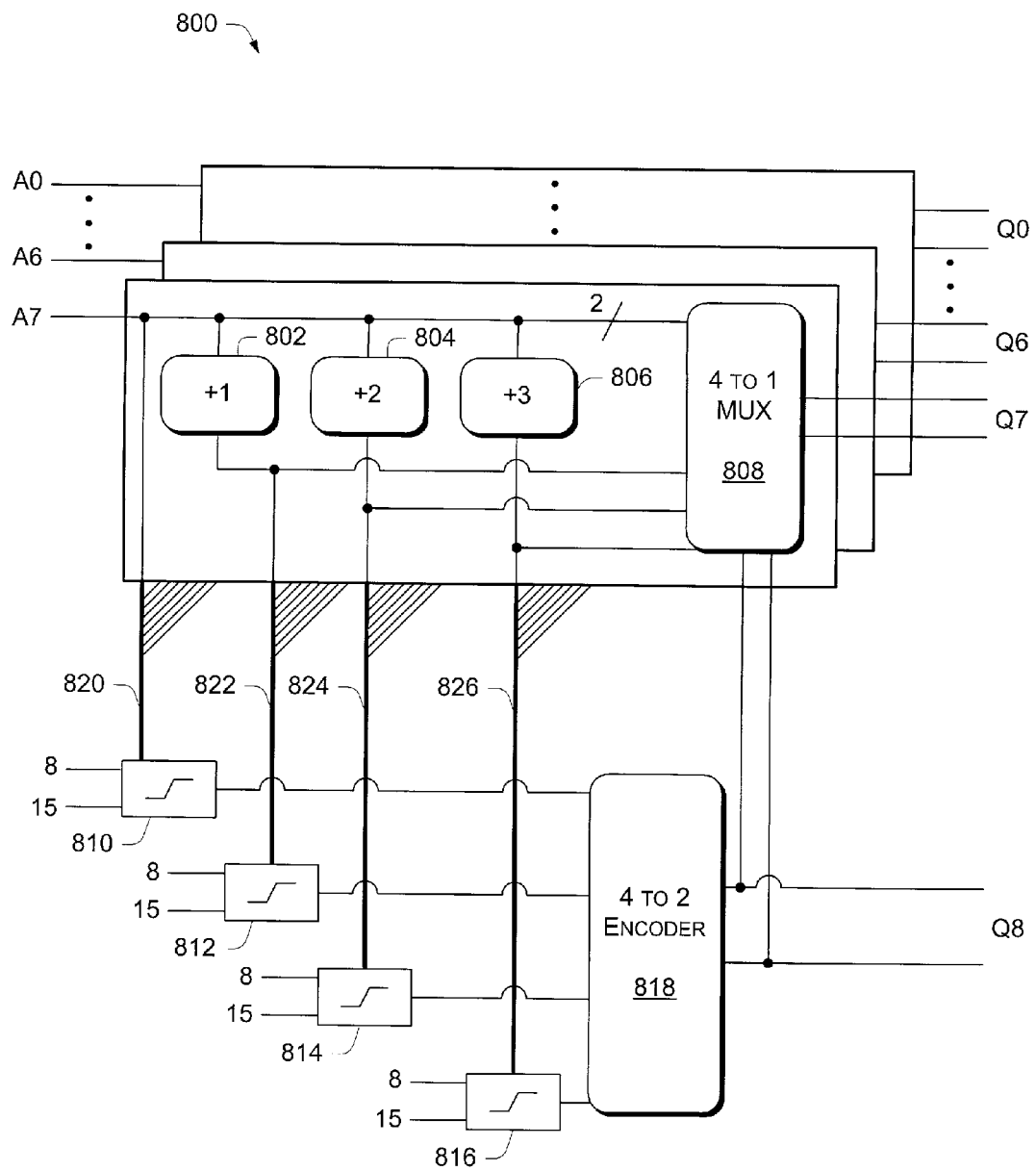
FIG. 8 illustrates a system capable of implementing the encoding procedure discussed with respect to FIG. 7.

FIG. 8 illustrates a system 800 capable of implementing the encoding procedure discussed with respect to FIG. 7. Each of the eight symbol lines (A0–A7) is coupled to three incrementers 802, 804, and 806. Incrementer 802 increments each symbol by one, incrementer 804 increments each symbol by two, and incrementer 806 increments each symbol by three. Each symbol line and the output of each incrementer 802, 804, and 806 are coupled to an input of a 4-to-1 multiplexer 808. The multiplexer 808 selects either the original symbol line, the symbol line incremented by one, the symbol line incremented by two, or the symbol line incremented by three, depending on the control signal received from a 4-to-2 encoder 818. The input selected by the multiplexer 808 is provided on the output of the multiplexer. The eight outputs from the eight multiplexers 808 are labeled Q0–Q7.

Four window comparators 810, 812, 814, and 816 are coupled to the encoder 818, and one of the symbol lines, or one of the three incrementers 802, 804, or 806. Each window comparator 810–816 has the same range of acceptable values (i.e., 8 through 15), as established by the minimum and maximum inputs of each window comparator. Window comparator 810 compares the non-incremented value of the byte of data (A0–A7) to the defined range (8–15). Window comparator 812 compares the eight symbols of data incremented by one to the defined range. Window comparator 814 compares the eight symbols of data incremented by two to the defined range. Window comparator 816 compares the eight bits of data incremented by three to the defined range. Each window comparator 810–816 sums the eight received signal lines before the window comparison is performed. Only one of the window comparator outputs will be asserted for any set of inputs.

Each window comparator 810–816 receives data on a bus 820, 822, 824, and 826, respectively. Each bus 820–826 includes eight signal lines. The seven diagonal lines extending from each bus 820–826 represent the signal lines received from the circuits associated with the other seven input signals (A0–A6). Thus, bus 820 includes signals {A7, A6, A5, A4, A3, A2, A1, A0}, bus 822 includes signals {A7+1,A6+1,A5+1,A4+1,A3+1,A2+1,A1+1,A0+1}, bus 824 include {A7+2,A6+2,A5+2,A4+2,A3+2,A2+2,A1+2,A0+2},and bus 826 includ signals {A7+3,A6+3,A5+3,A4+3,A3+3,A2+3,A1+3,A0+3}.

Figure 9:
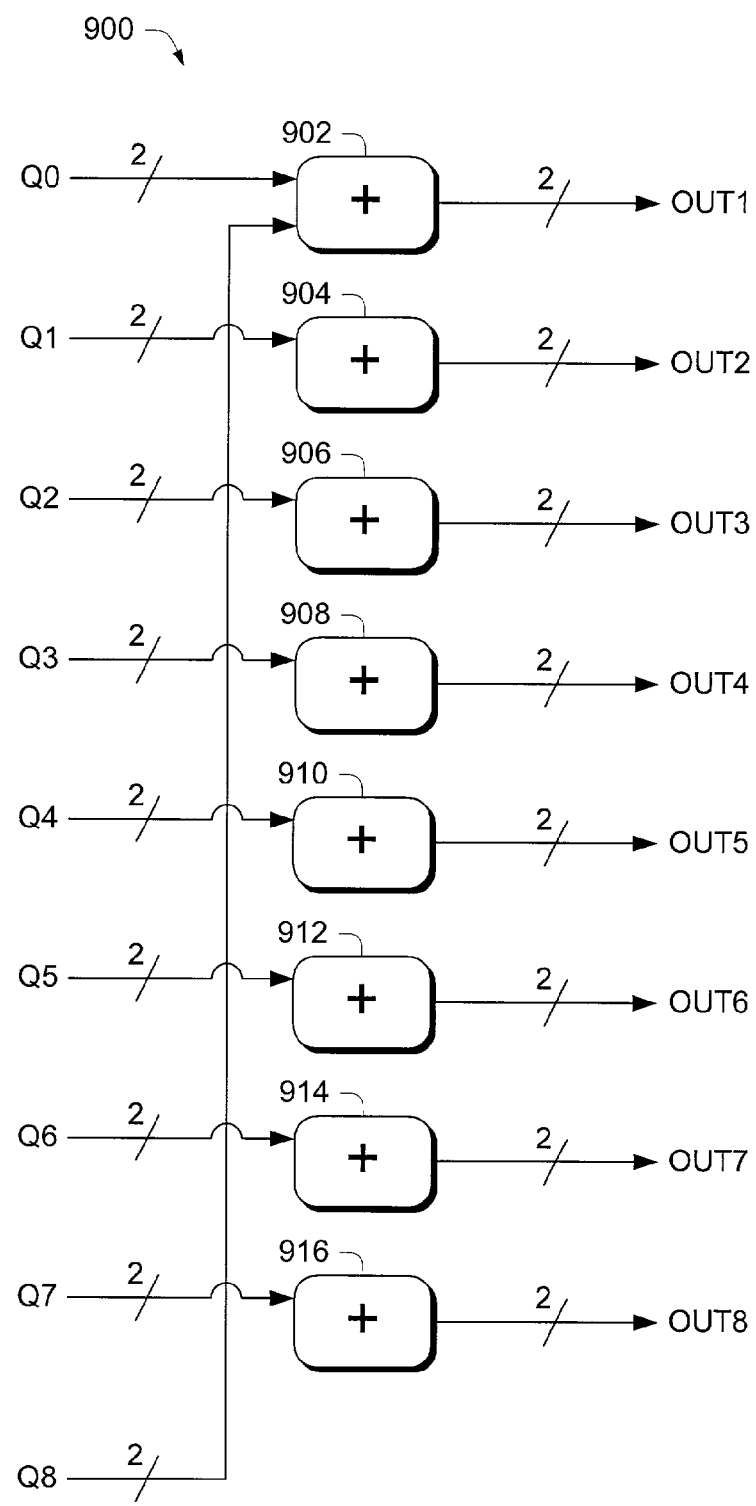
FIG. 9 illustrates a system capable of decoding data that was encoded by the system shown in FIG. 8.

FIG. 9 illustrates a system 900 capable of decoding data that was encoded by the system shown in FIG. 8. System 900 receives nine two-bit signals, labeled Q0–Q8. Eight summation devices 902–916, sum together two different two-bit signals. For example, summation device 902 sums signals Q0 and Q8, summation device 904 sums signals Q1 and Q8, and so forth. Each summation device 902–916 generates a two-bit output, labeled OUT1–OUT8,respectively. Each two-bit output represents the sum of the two input signals provided to the corresponding summation device.

The logic to encode and decode the data does not require any storage or synchronous clocking. Therefore, the logic's impact on the latency of the transmission system is limited to the gate delays of the encoder and the decoder. Since the incrementing is performed on a bit-by-bit basis, a highly parallel encoding structure can be used.

Thus, there has been described a system that supports multiple discrete signal levels on a signal path to allow the transmission of various symbols. In one embodiment, the system supports eight discrete signal levels on the signal path such that each symbol represents three bits. In another embodiment, the system supports M discrete signal levels on the signal path such that each symbol represents $\log_2$ M bits.

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. In a system in which data transmissions on a multi-conductor signal path produce current flow based on the value of the data transmitted, a method of reducing change in current flow between successive data transmissions, the method comprising:
   encoding data values represented by sets of N bits to produce corresponding sets of M symbols, each of the symbols to be transmitted on a respective signal conductor of the multi-conductor signal path and representing a plurality of bits, and each set of M symbols being selected to produce a current flow within a predetermined range of current flows; and
   transmitting the sets of M symbols.

2. A method as recited in claim 1 wherein each set of M symbols represents more than N bits.

3. A method as recited in claim 1 further including decoding the data values from the sets of M symbols.

4. A method as recited in claim 1 wherein each conductor in the multi-conductor signal path supports four different symbols.

5. A method as recited in claim 1 wherein each symbol represents two bits.

6. A method of multi-level signaling, the method comprising:
   determining whether signal current required to transmit a data element is within a predetermined range of current values;
   encoding the data element if the current required to transmit the data element is not within the predetermined range of current values, wherein the data element is encoded such that the signal current required to transmit the data element is within the predetermined range of current values; and
   adding a signal to the encoded data element to indicate any encoding of the data element.

7. A method as recited in claim 6 further including transmitting the encoded data.

8. A method as recited in claim 6 further including transmitting the encoded data across multiple conductors, wherein each conductor supports four different signal levels.

9. A method as recited in claim 6 wherein the data element is a byte of data.

10. A method as recited in claim 6 wherein encoding the data element includes incrementing each symbol of the data element.

11. A method as recited in claim 6 wherein encoding the data element includes repeatedly incrementing all bits of the data element until the signal current required to transmit the data element is within the predetermined range of current values.

12. One or more computer readable media storing computer-executable instructions that, when executed on one or more processors, perform the method of claim 6.

13. A method of encoding a set of bits for transmission in a system that supports at least four discrete signal levels on a transmission medium, the method comprising:
   encoding a first group of N bits of the set of bits using a first encoding scheme to generate a first encoded bit set that includes at least N+1 bits, wherein the first encoded bit set has a first weighting corresponding to states of the at least N+1 bits of the first encoded bit set;
   encoding a second group of N bits of the set of bits using a second encoding scheme to generate a second encoded bit set that includes at least N+1 bits, wherein the second encoded bit set has a second weighting corresponding to states of the at least N+1 bits of the second encoded bit set;
   when a combination of the first weighting and the second weighting is within a predetermined weighting range, combining the first and second bit sets to produce an output symbol set;
   when the combination of the first weighting and the second weighting is outside of the predetermined weighting range:
   encoding the second group of N bits of the set of bits using a third encoding scheme to generate a third encoded bit set that includes at least N+1 bits, wherein the third encoded bit set has a third weighting that is different from the second weighting; and
   combining the first and third encoded bit sets to produce the output symbol set.

14. A method as recited in claim 13 wherein the set of bits represents four input symbols, wherein each of the input symbols represents a most-significant bit and a least-significant bit, and wherein the output symbol set includes five output symbols, such that each of the output symbols represent two bits.

15. A method as recited in claim 14 wherein the first group of bits includes the most-significant bits of the input symbols and the second group of bits includes the least-significant bits of the input symbols.

16. A method as recited in claim 13 wherein:
the first weighting is determined based on a number of binary ones included in the first encoded bit set multiplied by a first variable;
the second weighting is determined based on a number of binary ones included in the second encoded set multiplied by a second variable; and
the third weighting is determined based on a number of binary ones included in the third encoded set multiplied by the second variable.

17. A method as recited in claim 16 wherein the predetermined weighting range spans a range equal to a value of the second variable.

18. A method as recited in claim 13 wherein the first encoding scheme is such that the first bit set includes either a first number of binary ones or a second number of binary ones, wherein when the first encoded bit set includes the second number of ones, the combination of the first and second encoded bit sets is outside of the predetermined weighting range.

19. A method as recited in claim 13 wherein when the second group of N bits contains all binary zeros, a first exception bit set is generated, wherein the output symbol set is produced by combining the first exception bit set with the first encoded bit set, wherein the output symbol set has a weighting that is within the predetermined weighting range.

20. A method as recited in claim 19 wherein, for all cases other than the case where the second group of N bits is all zeros, the second encoded bit set for a corresponding second group of N bits is the bit-wise inverse of the third encoded bit set for the corresponding second group of N bits.

21. A method as recited in claim 19 wherein when the first and second groups of N bits both contain all zeros, a second exception bit set is generated as the first encoded bit set and a fourth encoded bit set is generated, wherein the second exception bit set and the fourth encoded bit set are combined to produce the output symbol set, wherein the fourth encoded bit set is generated such that weighting of the output symbol set is within the predetermined weighting range.

22. A method as recited in claim 13 further comprising transmitting symbols in the output symbol set in parallel over a plurality of lines.

23. A method as recited in claim 22 wherein each line of the plurality of lines is a communication medium that supports the at least four signal levels.

24. A method as recited in claim 13 further comprising:
serializing at least a portion of the symbols of the output symbol set to produce a serial stream of symbols; and
serially transmitting the serial stream of symbols over a line.

25. A method as recited in claim 24 wherein the line is a communication medium that supports the at least four discrete signal levels.

26. A method as recited in claim 13 wherein the system supports at least eight discrete signal levels on the transmission medium, wherein the set of bits represents a first number of input symbols, wherein each of the input symbols represents three bits, and wherein each symbol in the output symbol set represents three bits.

27. A method as recited in claim 13 wherein the system supports at least M discrete signal levels on the transmission medium, wherein the set of bits represents a first number of input symbols, wherein each of the input symbols represents $\log_2 M$ bits, and wherein each symbol in the output symbol set represents $\log_2 M$ bits.

28. A method comprising:
receiving a data value to be transmitted across a plurality of conductors using current mode drivers, wherein each of the plurality of conductors supports multiple signal levels;
determining whether a sum of the currents required to transmit the data value is within a predetermined range of current values;
transmitting the data value if the sum of the currents is within the predetermined range of current values; and
encoding the data and transmitting the encoded data if the sum of the currents is not within the predetermined range of current values, wherein the data is encoded such that the sum of the currents is within the predetermined range of current values.

29. A method as recited in claim 28 wherein the predetermined range of values reduces current changes between successive data values.

30. A method as recited in claim 28 wherein the received data value is a byte of data.

31. A method as recited in claim 28 wherein encoding the data value includes incrementing each symbol of the data value.

32. A method as recited in claim 28 wherein encoding the data value includes incrementing all bits of the data value until the current required to transmit the signal is within the predetermined range of current values.

33. A method of decoding a set of bits in a system that is capable of receiving at least four discrete signal levels on a transmission medium, the method comprising:
decoding a first group of bits using a first decoding scheme to generate a first decoded group of bits;
decoding a second group of bits using a second decoding scheme to generate a second decoded group of bits;
analyzing the first group of bits to determine whether the first group of bits represents a first exception bit set or a second exception bit set;
if the first group of bits represents a first exception bit set, then replacing the first decoded group of bits with the second decoded group of bits and replacing the second decoded group of bits with a first predetermined value; and
if the first group of bits represents a second exception bit set, then replacing the first decoded group of bits with a second predetermined value and replacing the second decoded group of bits with the first predetermined value.

34. A method as recited in claim 33 wherein the bits of the first predetermined value are all zeros and the bits of the second predetermined value are all zeros.

35. A method as recited in claim 33 further comprising deserializing a serial stream of symbols to identify the first group of bits and the second group of bits.

36. An apparatus comprising:
a plurality of multi-level output drivers coupled to a plurality of conductors, each of the multi-level output drivers to output a signal representative of more than a single binary bit onto a respective one of the conductors; and
an encoder configured to receive a data element, the encoder having outputs coupled to the plurality of multi-level output drivers, the encoder encoding the data element, if necessary, to maintain the signal current required to transmit the data element within a predetermined range of values.

37. An apparatus as recited in claim 36 wherein the encoder further adds a symbol to the data element to indicate any encoding of the data element.

38. An apparatus as recited in claim 36 wherein the plurality of conductors form a transmission channel.

39. An apparatus as recited in claim 36 wherein the encoder encodes the data element by incrementing each symbol of the data element.

40. An apparatus as recited in claim 36 further including transmitting the encoded data element across the plurality of conductors.

41. An apparatus as recited in claim 36 wherein the plurality of multi-level output drivers are multi-level current drivers.

42. An apparatus as recited in claim 36 further including a decoder coupled to the encoder, wherein the decoder decodes the signal received from the plurality of multi-level output drivers.

43. An apparatus to encode a set of bits for transmission in a system that supports at least four discrete signal levels on a transmission medium, the apparatus comprising:
   a first encoder configured to encode a first group of N bits of the set of bits using a first encoding scheme, wherein the first encoder generates a first encoded bit set that includes at least N+1 bits, wherein the first encoded bit set has a first weighting corresponding to states of the at least N+1 bits of the first encoded bit set;
   a second encoder configured to encode a second group of N bits of the set of bits using a second encoding scheme, wherein the second encoder generates a second encoded bit set that includes at least N+1 bits, wherein the second encoded bit set has a second weighting corresponding to states of the at least N+1 bits of the second encoded bit set;
   a first comparator coupled to the first encoder and configured to determine whether the first weighting has a first predetermined value; and
   a second comparator coupled to the second encoder and configured to determine whether the second weighting has a second predetermined value.

44. An apparatus as recited in claim 43 further comprising a logic gate coupled to the first comparator and the second comparator such that the logic gate determines whether the first weighting has the first predetermined value.

45. An apparatus as recited in claim 44 wherein the logic gate further determines whether the second weighting has the second predetermined value.

46. An apparatus to decode a set of bits received by a system, the apparatus comprising:
   a first decoder configured to decode a first group of bits using a first decoding scheme, wherein the first decoder generates a first decoded group of bits;
   a second decoder configured to decode a second group of bits using a second decoding scheme, wherein the second decoder generates a second decoded group of bits;
   a first comparator coupled to the first decoder and configured to determine whether the first group of bits represents a first exception bit set;
   if the first group of bits represents the first exception bit set, then the first decoded group of bits is replaced with the second decoded group of bits and the second decoded group of bits is replaced with a first predetermined value;
   a second comparator coupled to the first decoder and coupled to determine whether the first group of bits represents a second exception bit set; and
   if the second group of bits represents the second exception bit set, then the first decoded group of bits is replaced with a second predetermined value and the second decoded group of bits is replaced with the first predetermined value.

47. An apparatus as recited in claim 46 wherein the bits of the first predetermined value are all zeros and the bits of the second predetermined value are all zeros.

48. An apparatus as recited in claim 46 further comprising a deserializer coupled to the first decoder and the second decoder, wherein the deserializer is configured to deserialize a serial stream of symbols.

* * * * *